Patented Oct. 14, 1947

2,429,080

UNITED STATES PATENT OFFICE 2,429,080

REDUCING THE CURING RATE OF BUTADIENE-STYRENE COPOLYMER RUBBER

Robert R. Sterrett, Naugatuck, Conn., assignor to United States Rubber Company, New York, N. Y., a corporation of New Jersey No Drawing. Application January 15, 1944,
Serial No. 518,416

1 Claim. (Cl. 260—79)

This invention relates to improvements in curing rubbery copolymers of butadiene and styrene.

It is known that chlorinated quinones such as tetrachlor para-benzoquinone, in the presence of certain oxidizing agents, vulcanize said copolymer rubbers. The vulcanization is quite rapid, and in many instances results in scorched stocks which causes waste and delay. Scorch is defined as a premature partial vulcanization of the stock brought about by heat present or developed during processing. A scorched stock is no longer completely thermoplastic and cannot be smoothly sheeted or extruded.

I have found that by adding a thiuramdisulfide having the structure

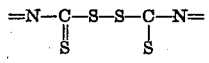

in which the terminal nitrogen is bonded to aliphatic hydrocarbon radicals such as alkyl or cycloalkyl (e. g., ethyl, butyl, amyl, cyclopentamethylene), benzyl, etc., and particularly a tetraalkyl thiuramdisulfide, to the butadiene-1,3-styrene copolymer rubber which is to be vulcanized with a member of the chlorinated quinone class of the non-sulfur vulcanizing agents, that the rate of cure can be greatly reduced and scorching prevented. Based on 100 parts, by weight, of the butadiene-1,3-styrene copolymer rubber the amount of the disulfide is proportioned, according to the amount of the said vulcanizing agent used, to be in amount sufficient to properly set the stock with substantially no scorching. Generally, the amounts used may range from .01 to about 4 parts of the disulfide per 100 parts of the rubber, although in certain cases more may be used.

The following example, in which the parts are by weight, illustrates the invention, it being understood that the invention is not to be limited thereto:

EXAMPLE

*Master batch*

| | |
|---|---:|
| GR-S (butadiene-1,3-styrene copolymer rubber) | 100.0 |
| Treated whiting | 100.0 |
| Special whiting | 30.0 |
| Mineral rubber | 12.0 |
| Zinc oxide | 15.0 |
| Stearic acid | 0.75 |
| | 257.75 |

| | A | B | C |
|---|---:|---:|---:|
| Above M. B. | 257.75 | 257.75 | 257.75 |
| Tetrachloro Para-benzoquinone | 0.6 | 0.6 | 0.6 |
| Tetramethyl Thiuramdisulfide | | 1.0 | 2.0 |
| PbO₂ | 8.0 | 8.0 | 8.0 |

*Scorch test at 239° F.*

| | A | | B | | C | |
|---|---|---|---|---|---|---|
| Time in Minutes | #/sq. in. Tensile | Per Cent Elong. at Break | #/sq. in. Tensile | Per Cent Elong. at Break | #/sq. in. Tensile | Per cent Elong. at Break |
| 10 | 560 | 393 | 326 | 456 | 267 | 410 |
| 15 | 600 | 543 | 323 | 610 | 288 | 590 |
| 20 | 720 | 550 | 420 | 623 | 330 | 570 |
| 30 | 653 | 526 | 496 | 656 | 374 | 603 |

There is a progressive reduction in rate of cure as the tetramethyl thiuramdisulfide is increased.

While I have shown various embodiments of the invention, it is to be understood that the invention is susceptible of those modifications which appear within the spirit of the invention and the scope of the appended claim, for example, other substituted thiuramdisulfides than the tetra-substituted materials may be used, e. g., the di-substituted thiuramdisulfides such as dibenzyl thiuramdisulfide.

Having thus described my invention, what I claim and desire to protect by Letters Patent is:

A method of reducing the rate of cure of a rubber-like copolymer of butadiene-1,3 and styrene with an oxidizing agent and tetrachlor p-benzoquinone, which comprises additionally adding to the stock before cure from .01 to 4 parts by weight of a thiuramdisulfide in which each nitrogen atom is bonded to aliphatic hydrocarbon radicals, per 100 parts by weight of the copolymer rubber.

ROBERT R. STERRETT.

REFERENCES CITED

The following references are of record in the file of this patent:

UNITED STATES PATENTS

| Number | Name | Date |
|---|---|---|
| 1,918,328 | Fisher | July 18, 1933 |
| 2,234,204 | Starkweather | Mar. 11, 1941 |